United States Patent

[11] 3,570,778

[72] Inventor  Clifford B. Bushnell
              Rochester, N.Y.
[21] Appl. No. 818,947
[22] Filed    Apr. 24, 1969
              Division of Ser. No. 450,948, April 26, 1965, abandoned.
[45] Patented Mar. 16, 1971
[73] Assignee Eastman Kodak Company
              Rochester, N.Y.

[54] FILM END TREATMENT ARRANGEMENT
     8 Claims, 8 Drawing Figs.
[52] U.S. Cl. .................................................. 242/56
[51] Int. Cl. .................................................. B65h 35/04
[50] Field of Search .................................................. 242/56

[56]          References Cited
           UNITED STATES PATENTS
1,265,456  5/1918  Koch ........................... 242/56
1,378,935  5/1921  Bishop ......................... 242/56
2,714,493  8/1955  Gramp .......................... 242/74

*Primary Examiner*—Nathan L. Mintz
*Attorneys*—W. O. Hodsdon and R. L. Randall

ABSTRACT: A method of forming a tightly wound roll of film comprising a backing paper strip interleaved with a length of pressure-sensitive photographic film, having a normal picture area between the lateral edges thereof, whereby the picture area is free of pressure marks. The method comprises the steps of starting to wind the backing paper strip tightly around a rotating mandrel, cutting an end of the film to have a reduced supporting configuration in the area corresponding to and longitudinally aligned with the normal picture area of the film and, while continuing the winding of the backing paper strip, maintaining tension in the backing paper strip. The cut end of the film is introduced into the nip of the backing paper being wound on the rotating mandrel, and the length of film is wound together with the remainder of the backing paper.

PATENTED MAR 16 1971　　3,570,778
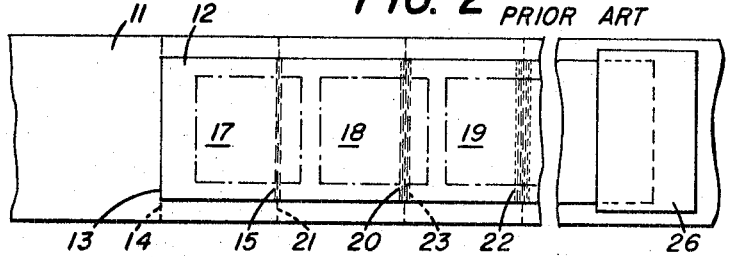
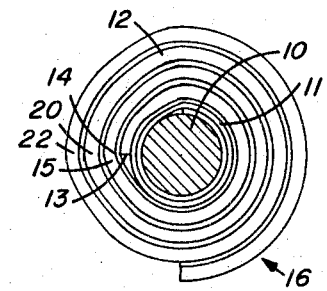
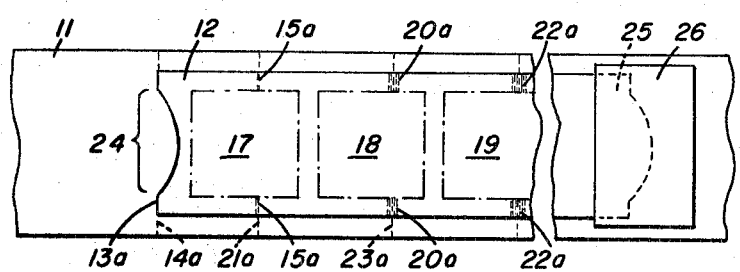
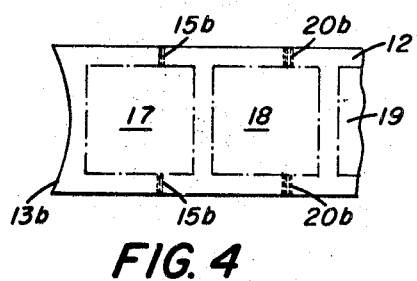
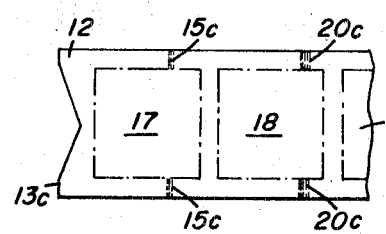
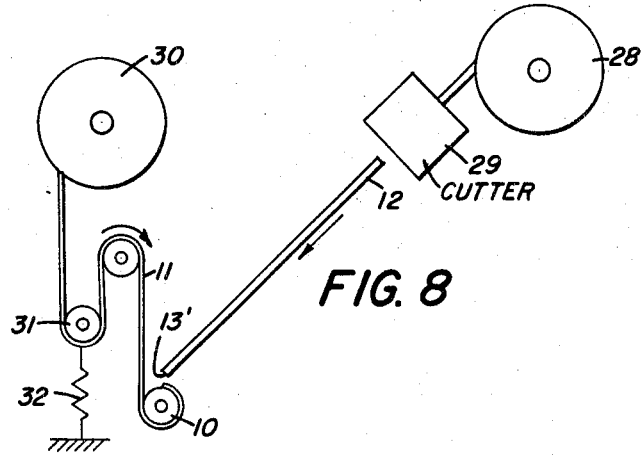
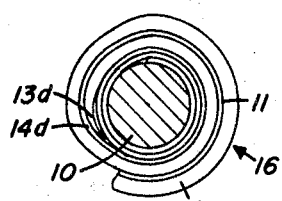
CLIFFORD B. BUSHNELL
INVENTOR.
BY
ATTORNEYS

FILM END TREATMENT ARRANGEMENT

CROSS-REFERENCE TO RELATED APPLICATIONS

The present application is a division of my copending application Ser. No. 450,948, filed Apr. 26, 1965, now abandoned.

BACKGROUND OF THE INVENTION

The present invention relates to a film end treatment arrangement and more particularly to a structure and method of preparing the end of a pressure-sensitive photographic filmstrip so that it will not cause pressure marks on successive convolutions in a roll.

Many types of photographic film are produced in rolls with the film wound tightly around itself or interleaved with a longer length of backing paper. Several camera arrangements require that the film roll be of a specific maximum size whereby the roll must be compactly wound for use in such cameras. Various films, particularly some of the better grade high-speed films including color films, are sensitive to concentrated pressure on the film emulsion. Also, winding of these films at acceptably high speeds for mass marketing makes it most economic to use a winding mandrel of no less than a certain minimum size such as three-eighths inch. Therefore, with both the minimum and maximum sizes predetermined, the film must be tightly wound in the roll to stay within the dimensional tolerances. However, as higher speed films are made, some of the photosensitive ingredients resulting in the higher speed picture taking capabilities tend to increase the pressure sensitivity of the film. As a result, cutting of the film in a sharp transverse line and winding a tight roll, sometimes results in pressure marks or "fog lines" on successive layers of the film wound over this sharp cut film end even when backing paper is used and when the mandrel is removed from the roll before packaging.

SUMMARY OF THE INVENTION

Therefore, an object of my invention is to provide an improved film end treatment to eliminate the tendency for creating such pressure marks.

A further object of my invention is a method of making a compact film roll which will not cause latent pressure marks in the film.

In accordance with one embodiment of my invention, prior to winding a film roll, a curved portion of the end of the film is removed throughout the region which will underlie the picture taking area of successive layers. In effect, this creates increased pressure at the edges of the filmstrip. Such increased pressure relieves the concentrated pressure in the picture area and thus alleviates the latent pressure image problem.

The subject matter which is regarded as my invention is particularly pointed out and distinctly claimed in the concluding portion of this specification. The invention, however, as to its organization and operation, together with further objects and advantages thereof, will best be understood by reference to the following description taken in connection with the accompanying drawing.

BRIEF DESCRIPTION OF THE DRAWINGS

FIG. 1 is an enlarged end view partially cut away of a conventional filmstrip with an interleaved backing paper both wound in a compact roll;

FIG. 2 is a partial plan view of the filmstrip shown in FIG. 1 with the latent pressure regions and picture areas indicated thereon;

FIG. 3 is a plan view similar to FIG. 2 of one embodiment of my invention;

FIG. 4 is a detail view of another embodiment of my invention;

FIG. 5 is a further embodiment of my invention;

FIG. 6 is a cross-sectional view of another embodiment of my invention;

FIG. 7 is an end view similar to FIG. 1 illustrating the operation of my invention as shown in FIG. 6; and FIG. 8 is a simplified schematic view of a machine for winding rolls incorporating my invention.

DESCRIPTION OF A PREFERRED EMBODIMENT

Referring now to the drawing, wherein like numbers indicate similar parts, I have shown in FIG. 1 a core or winding mandrel 10 upon which an inner portion of a backing paper 11 and a conventional filmstrip 12 have been compactly wound. It should be noted that the filmstrip 12 is substantially thicker than the paper 11. The end 13 of the conventional filmstrip nearest the mandrel is referred to hereinafter as the "trailing" end of the film, because this end 13 is first to be wound on the mandrel 10, it is, in fact, a trailing end in a completed roll. The trailing end 13 is cut transversely and sharply whereby it creates a sharp departure of the backing paper convolution wound thereon as indicated at 14. This sharp change of direction 14 in the backing paper 11 is transferred to a next layer of film and causes "pressure line" at a portion indicated at 15. The entire roll 16 is wound tightly on the mandrel 10 to maintain acceptable tolerances of its overall dimensions while maintaining a suitable size mandrel 10 for high-speed winding. Thus, the sharp bend illustrated at 14 in the backing paper causing the pressure line 15 is transferred, although to a lesser and lesser extent, to successive layers of paper and film on a roll 16 being wound. Furthermore, the pressure lines are formed in the film during winding and appear in the processed film even though the mandrel is removed after winding and the roll is packed and used as a "core-less" roll.

Referring now to FIG. 2, several of the innermost image areas of this filmstrip are indicated at 17, 18 and 19 in phantom lines on a portion of the unrolled paper 11 and conventional filmstrip 12. These image areas nearest the sharply cut end 13 of the filmstrip have thereacross latent pressure lines. A most pronounced pressure line is indicated at 15 and is caused by the sharp crease of the underlying paper in the roll at 14. Another pressure line indicated at 20 is slightly wider and less dense and caused by the somewhat less sharp crease of the paper at 21, and a third pressure line indicated at 22 is caused by the crease line of the paper at 23. Usually, the pressure line 15 nearest the end 13 will be the most prominent. However, because of the tightness of the roll, the pressure lines 20 and 22 are often visible in a developed high-speed filmstrip 12 and prints derived therefrom.

In FIG. 3 I have shown one embodiment of my invention for avoiding such pressure lines of the conventional arrangements illustrated above. A curved center portion 24 of the filmstrip is cut out or notched from the film end 13 to provide a modified end 13a prior to winding the filmstrip 12 on the mandrel 10. Thus the edges of the film extend beyond the area aligned with the picture area. This results in increased pressure and pressure marks 15a at the edges of the filmstrip 12 remote from the picture areas 17, 18, and 19, but relieves the pressure throughout the center of the filmstrip 12 by providing a reduced pressure gradient. The pressure marks 15a at the edges of the filmstrip will usually be more pronounced than the pressure line 15 extending entirely across the filmstrip 12 because of the increased concentration of pressure. However, they do not affect any of the useful picture areas of the film 12 and are, therefore, of no consequence. Similar pressure marks 20a and 22a also appear in the border area of the filmstrip 12.

Since the backing paper 11, as at 14a, is slung (somewhat like a hammock) across the region longitudinally aligned with picture images, as indicated at 24, the pressure concentration is greatly reduced whereby the bend is spread or distributed over one-eighth or one-fourth inch length of the filmstrip This configuration reduces the pressure marks in the picture area. In order to eliminate the film scrap handling problems, the portion 25 notched out is left on the other end of the film under a paster 26.

Referring now to FIGS. 4 and 5, I have illustrated other end treatments which will provide substantially similar elimination of the pressure in the picture taking area 17. In FIG. 4 the cutout portion 13b is an arcuate form extending entirely across the end of the filmstrip 12 rather than just across the area longitudinally aligned with the picture images as in FIG. 3. Again the pressure marks 15b and 20b are concentrated in the margins of the filmstrip 12. In FIG. 5 the end cut line 13c of the film 12 assumes a zigzag line configuration rather than the curve formation shown in FIGS. 3 or 4. This results in pressure marks 15c and 20c similar to those in FIG. 3.

Referring now to FIG. 6, I have shown another embodiment of my invention wherein the end 13d of the filmstrip 12 is beveled or tapered across the thickness of the film rather than being notched out as discussed above. As illustrated in FIG. 7, this tapered end 13d of the filmstrip 12 provides distributed support of the paper 11 in the region 14d rather than the sharp bend as illustrated in FIG. 1. In several of the high-speed films most sensitive to pressure marks, this longitudinally distributed support is sufficiently gradual, in other words of a low enough pressure gradient, to alleviate pressure lines in successive convolutions. Thus the pressure marks 15, 20, and 22 are eliminated. Obviously, the taper, as illustrated at 13d, may be accomplished during the cutting of the filmstrip 12 and the taper may be combined with the configurations illustrated in FIGS. 3, 4, and 5. For instance, it would be completely acceptable to cut the edges as in FIG. 3 at 13a of the filmstrip sharply as in prior art arrangements and to taper only the center portion 24. Such a tapered system would have a plan view appearance very similar to that illustrated in FIGS. 3 or 5.

As will now be apparent, the method of cutting the film prior to winding the film into a compact roll so as to transfer the film pressure from the region of the picture area will eliminate damaging pressure marks from high photographic speed tightly wound rolls. This method includes the steps of providing a pressure-sensitive film 12 in strip form; trimming the "trailing" ends of the film prior to winding the film into a roll so that the pressure transferred to an overlying picture area is no longer sufficiently concentrated to cause pressure marks; and winding the filmstrip with the trimmed edge underlying another layer of film. Obviously, the trimming step is important to my invention so that the formerly concentrated pressure is distributed over a length of film whereby latent pressure lines do not form in the overlying film image area.

Such a method may be accomplished in a machine indicated in simplified schematic form in FIG. 8 wherein a supply roll 28 furnishes the filmstrip material to a strip chopper 29 which trims the "trailing" ends, indicated at 13' and as discussed above, prior to their being wound on a core or mandrel 10. Also backing paper is supplied from a supply roll 30 to be wound in an interleaving fashion on the mandrel 10. During the winding operation, the tension of the paper 11 (and/or the film 12) is maintained at a magnitude which will provide a suitable tight roll 16. This tension may be most easily maintained by means such as a dancer roll 31, operable on the paper 11. The tension system is indicated in FIG. 8 as a bias means 32 such as a spring, but in more sophisticated winding machines will not be quite as simple as a single-spring system. Obviously, the roll winding machine indicated in FIG. 8 will require several elaborate control mechanisms and guide means, but detailed discussion of these items will not greatly clarify the present invention. Moreover, suitable winding machines are illustrated in the prior art and need not be set forth in detail herein.

While I have shown a particular embodiment of this invention, modifications thereof will occur to those skilled in this art. I intend, therefore, to have the appended claims cover such embodiments as properly fall within the scope of the present invention.

I claim:
1. A method of forming a film roll having therein a length of photographic filmstrip subject to pressure sensitivity considerations, comprising the steps of:
   trimming an end of the film to have a reduced supporting configuration in the area corresponding to and longitudinally aligned with the normal picture area of the film; and
   while maintaining tension on the filmstrip tightly winding the filmstrip on a driven rotating mandrel with the trimmed end innermost so that the support of overlaying layers on the compact roll thus formed do not have pressure concentrations in the picture areas of the film sufficient to create objectionable latent pressure marks.

2. A method of forming a roll as in claim 1 having steps of:
   interleaving a backing paper with the film; and
   maintaining tension in the backing paper during such winding step to provide the tightly wound roll and to thus regulate the overall dimension thereof.

3. A method of forming a compact film roll having therein film subject to pressure sensitivity considerations, comprising the steps of:
   cutting a length of such film into a strip with the cutting step forming one end of the filmstrip; and
   while maintaining tension on the filmstrip tightly winding the filmstrip on a driven rotating mandrel with the one end innermost in the roll, said cutting step forming the one end so that the edges of the film provide support for the next adjacent convolution prior to the central portion providing maximum thickness support.

4. A method of forming a compact film roll as in claim 3 wherein the cutting step trims the one end so that the edges project further into the roll than the central portion.

5. A method of forming a compact film roll from a strip of photographic film the photographic properties of which are affected by pressure, comprising:
   shaping one end of the strip so that lateral marginal portions of the strip at said one end extend lengthwise of the strip beyond the remainder of the strip at said one end; and
   while maintaining tension on the filmstrip winding the strip on a driven rotating mandrel into a multilayered compact roll with said one end innermost whereby pressure between said end and the next adjacent layer will be concentrated at said marginal portions.

6. A method of forming a compact film roll as in claim 5, having steps of:
   interleaving a backing paper with the film; and
   maintaining tension on the backing paper during such forming step.

7. A method for forming a tightly wound roll of film comprising a backing paper strip interleaved with a length of pressure-sensitive photographic film having a normal picture area between the lateral edges thereof whereby said normal picture area is free of pressure marks, comprising the steps of winding a first end of a backing paper strip tightly around a driven rotating mandrel, cutting an end of said film to have a reduced supporting configuration in the area corresponding to and longitudinally aligned with the normal picture area of the film, while continuing the winding of the backing paper strip maintaining tension in the backing paper strip, introducing said cut end of said film into the nip of the backing paper being wound on the driven rotating mandrel, and winding the length of film together with the remainder of the backing paper.

8. The method according to claim 7 wherein, upon completion of said winding step, said mandrel is withdrawn from said tightly wound roll.